US010009346B2

(12) United States Patent
Gopalakrishna (10) Patent No.: US 10,009,346 B2
(45) Date of Patent: Jun. 26, 2018

(54) HETEROGENEOUS CLUSTERED ANTI-PASS BACK HOST PROCESSING SYSTEM AND METHOD

(71) Applicant: Honeywell International Inc., Morristown, NJ (US)

(72) Inventor: Rajesh Gopalakrishna, Sterling, VA (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 187 days.

(21) Appl. No.: 14/984,158

(22) Filed: Dec. 30, 2015

(65) Prior Publication Data

US 2017/0048246 A1 Feb. 16, 2017

Related U.S. Application Data

(60) Provisional application No. 62/203,766, filed on Aug. 11, 2015.

(51) Int. Cl.
*H04L 29/06* (2006.01)
*G07C 9/00* (2006.01)
*G06F 21/34* (2013.01)
*G07C 9/02* (2006.01)
*G06F 21/31* (2013.01)

(52) U.S. Cl.
CPC .............. *H04L 63/10* (2013.01); *G06F 21/34* (2013.01); *G07C 9/00007* (2013.01); *G07C 9/00111* (2013.01); *G07C 9/00119* (2013.01); *G07C 9/025* (2013.01); *H04L 63/0281* (2013.01);

(Continued)

(58) Field of Classification Search
CPC ............ G07C 9/00007; G07C 9/00103; G07C 9/00111; G07C 9/00119
See application file for complete search history.

(56) References Cited

U.S. PATENT DOCUMENTS

2012/0032775 A1 2/2012 Kikuchi

FOREIGN PATENT DOCUMENTS

EP 2 584 538 A1 4/2013
WO WO 2005/083210 A1 9/2005

OTHER PUBLICATIONS

"Anti-passback and roll call", Siemens Building Technologies Fire Safety and Security Products, 2008, 12 pages.*

(Continued)

*Primary Examiner* — Thaddeus J Plecha
(74) *Attorney, Agent, or Firm* — Husch Blackwell LLP (57) ABSTRACT

A heterogeneous clustered anti-pass back host processing system and method can include a single heterogeneous host system receiving a triggering signal from a first access controller in a plurality of access controllers, the single heterogeneous host system identifying all areas referenced by the first access controller, a respective type of anti-pass back feature associated with each of the areas referenced by the first access controller, and a least restrictive type of the respective type of anti-pass back feature associated with each of the areas referenced by the first access controller, and the single heterogeneous host system transmitting an anti-pass back status update message to each of the plurality of access controllers in accordance with rules of the least restrictive type of the respective type of anti-pass back feature associated with each of the areas referenced by the first access controller.

17 Claims, 9 Drawing Sheets

(52) U.S. Cl.
CPC .......... *H04L 63/1408* (2013.01); *G06F 21/31* (2013.01); *G07C 9/00103* (2013.01)

(56) References Cited

OTHER PUBLICATIONS

"Global Antipassback", DSX Access Systems, 2011, 1 page.*
Extended European search report from corresponding EP patent application 16182275.4, dated Dec. 21, 2016.
Paxton, "Configuring anti-passback Anti-passback principles", URL: http://www.paxton-access.com/docs/Applicationnotes/AN1063-US.pdf, dated May 23, 2008.

* cited by examiner

| Sno | Pass back type setting for each area | Total number of APB status downloads generated to panels for 1 valid card swipe on a reader on | | | | | Total number of APB status messages generated and processed by host |
|---|---|---|---|---|---|---|---|
| | | Area1 | Area2 | Area3 | Area4 | Area5 | |
| 1 | GLOBAL APB | 7 | 7 | 7 | 7 | 7 | 35 |
| 2 | SITE Based APB | 1 | 2 | 2 | 1 | 0 | 6 |
| 3 | Area-based APB | 1 | 1 | 0 | 1 | 0 | 3 |

*FIG. 6*

| Sno | Pass back type setting for each area | Total number of APB status downloads generated to panels for 1 valid card swipe on a reader on | | | | | Total number of APB status messages generated and processed by host |
|---|---|---|---|---|---|---|---|
| | | Area1 | Area2 | Area3 | Area4 | Area5 | |
| 1 | Area1=GLOBAL APB<br>Area2=SITE APB<br>Area3=Areas APB<br>Area4=SITE APB<br>Area5=Area APB | 7 | 2 | 0 | 1 | 0 | 10 |
| 2 | Area1=GLOBAL APB<br>Area2=SITE APB<br>Area3=Areas APB<br>Area4=SITE APB<br>Area5=GLOBAL APB | 7 | 2 | 0 | 1 | 7 | 17 |
| 3 | Area1=GLOBAL APB<br>Area2=SITE APB<br>Area3=SITE APB<br>Area4=SITE APB<br>Area5=Area APB | 7 | 2 | 2 | 1 | 0 | 12 |
| 4 | Area1=AREA APB<br>Area2=SITE APB<br>Area3=SITE APB<br>Area4=SITE APB<br>Area5=Area APB | 1 | 2 | 2 | 1 | 0 | 6 |

FIG. 9

HETEROGENEOUS CLUSTERED ANTI-PASS BACK HOST PROCESSING SYSTEM AND METHOD

CROSS-REFERENCE TO RELATED APPLICATIONS

This application claims priority to U.S. Provisional Patent Application No. 62/203,766 filed Aug. 11, 2015 and titled "Heterogeneous Clustered Anti-Pass Back Host Processing System and Method." U.S. Provisional Patent Application No. 62/203,766 is hereby incorporated by reference.

FIELD

The present invention relates generally to a system and method of host processing in a security system. More particularly, the present invention relates to a heterogeneous clustered anti-pass back host processing system and method.

BACKGROUND

Many known access control systems can include an anti-pass back (APB) feature that prevents unauthorized users from tailgating an authorized user to gain access to a secured region. For example, when a user presents a valid access card to a card reader to gain access to a secured region, an APB feature prevents an unauthorized second user from using the same card to gain access to the region. Such an APB feature can include dividing a secured region or facility into AREAs, designating different card readers as an IN reader or an OUT reader, and controlling access to the secured region in accordance with three rules: (1) a user presenting a valid card to an IN reader must present the same card to an OUT reader before again presenting the card to an IN reader, (2) after presenting a valid card to an IN reader, a user presenting the same card to the same or another IN reader, without presenting the card to an OUT reader, will be disallowed access, and (3) after presenting a valid card to an OUT reader, a user presenting the same card to the same or another OUT reader, without presenting the card to an IN reader, will be disallowed access.

Known access control systems can include a host system, one or more SITEs, and one or more AREAs. For example, a host system can include any system that is capable of communicating with an access controller and sending an APB status message to an access controller. A SITE can include a logical group or cluster of access controllers based on proximity, region, or location, and an AREA can include a group of IN readers and OUT readers that are associated with one or more access controllers and that adhere to the above-identified rules. For example, an AREA can include access controllers from a single SITE and typically does not include access controllers from multiple SITEs.

In known access control systems, a host system that processes APB status update messages can be designated as a GLOBAL, SITE based, or AREA based system. For example, when a GLOBAL APB feature is employed, a valid card transaction that occurs at one card reader communicating with one access controller can lead to an APB status update message being broadcast to all other controllers in the facility that are participating in the APB feature. When a SITE based APB feature is employed, an APB status update message can be limited to being broadcast to controllers in a particular SITE and located in referencing AREAs. When an AREA based APB feature is employed, an APB status update message can be limited to being broadcast to controllers located in referencing AREAs. It is to be understood that a valid card transaction as used herein can include a transaction that allows a user to gain access via a secured entryway by presenting or swiping a valid access card to or on a card reader.

Figure 1:
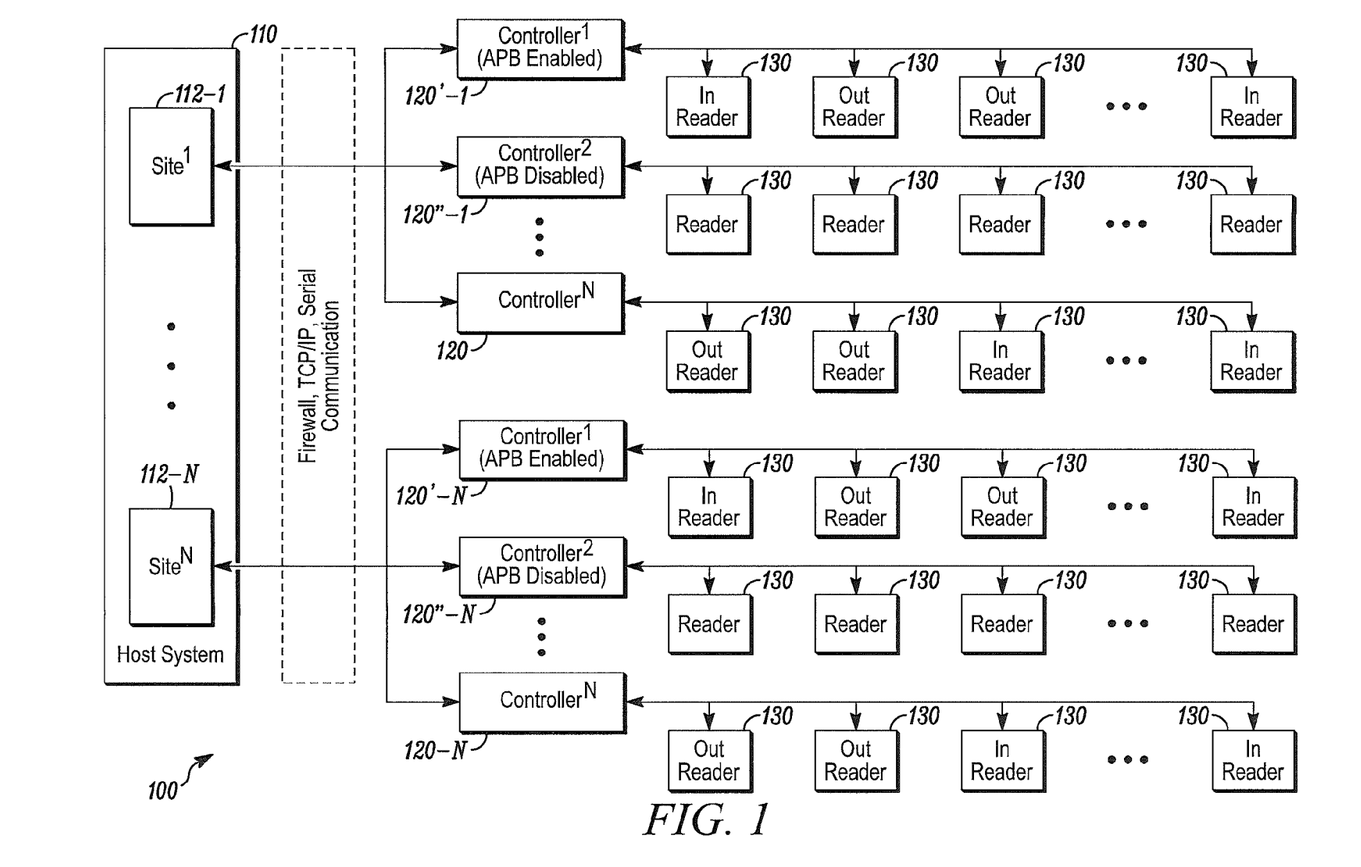
FIG. 1 is a block diagram of a known access control system.

FIG. 1 is a block diagram of a known access control system 100 that includes a single APB host system 110 supporting and communicating with a plurality of access controllers 120, APB enabled access controllers 120' and APB disabled access controllers 120". It is to be understood that an access controller 120 can be either APB enabled or APB disabled. As seen in FIG. 1, the host system 110 can support a plurality of SITEs 112, each of which can include a plurality of access controllers 120, 120', 120". Furthermore, each of the controllers 120 can support and communicate with a plurality of IN or OUT readers 130 that are in a respective SITE. For example, the host system 110 can support and communicate with APB enabled controller 120'-1, APB disabled controller 120"-1, and controller 120-1, each of which is in the logical grouping of SITE 1 112-1. Similarly, the host system 110 can support and communicate with APB enabled controller 120'-N, APB disabled controller 120"-N, and controller 120-N, each of which is in the logical grouping of SITE N 112-N.

Figure 2:
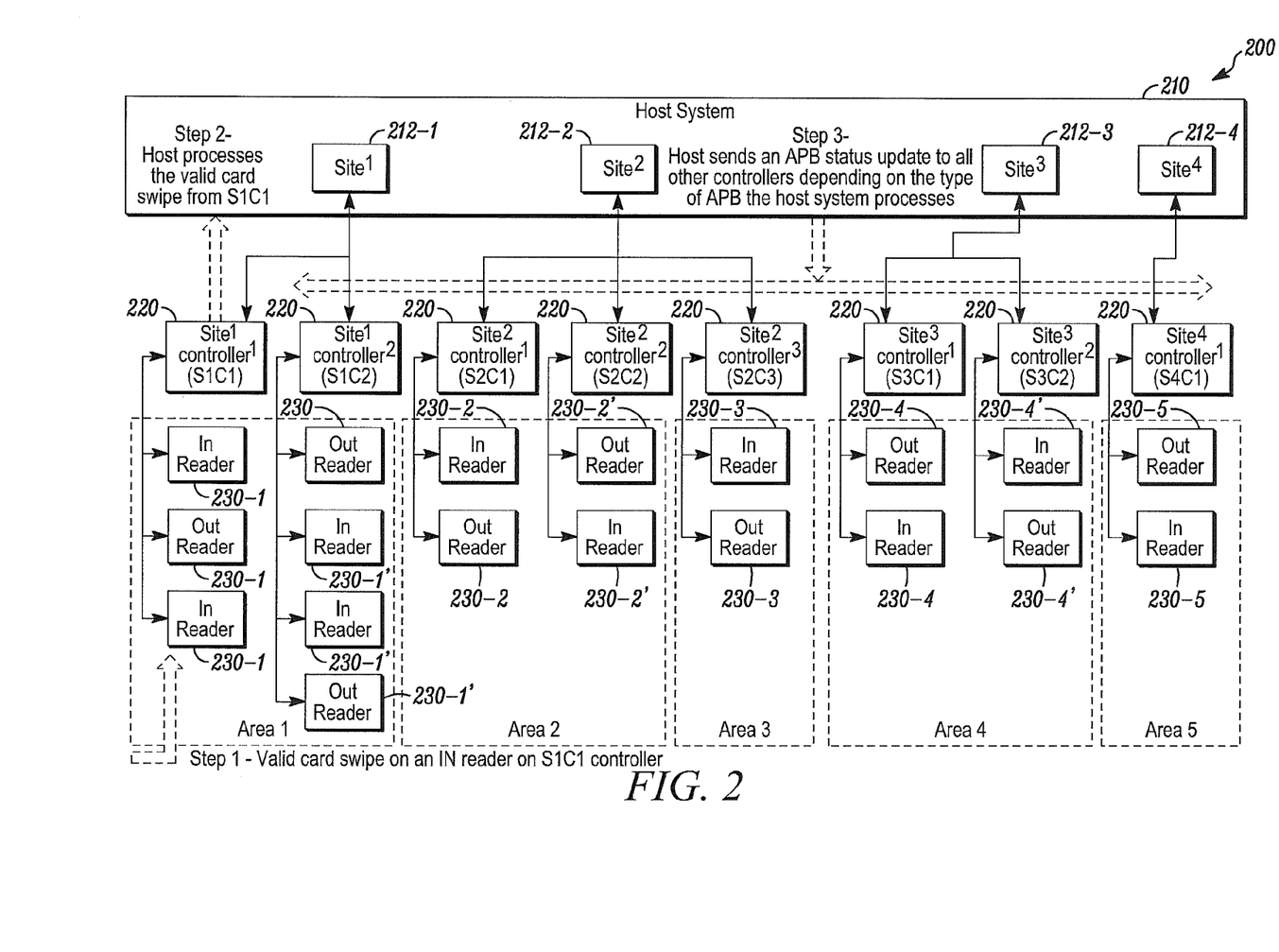
FIG. 2 is a block diagram of a known access control system.

FIG. 2 is a block diagram of a known access control system 200 that includes an APB host system 210 that supports a plurality of SITEs and AREAs. As seen in FIG. 2, the host system 210 can support a plurality of SITEs 212, each of which can include a plurality of access controllers 220. For example, the host system 210 can support and communicate with controllers S1C1, S1C2 that are in the logical grouping of SITE 1 212-1, the host system 210 can support and communicate with controllers S2C1, S2C2, S2C3 that are in the logical grouping of SITE 2 212-2, the host system 210 can support and communicate with controllers S3C1, S3C2 that are in the logical grouping of SITE 3 212-3, and the host system 210 can support and communicate with controller S4C1 that is in the logical grouping of SITE 4 212-4.

As further seen in FIG. 2, each of the controllers 220 can support and communicate with a plurality of IN or OUT card readers 230 located in referencing AREAs. For example, controller S1C1 in the logical grouping of SITE 1 212-1 can support and communicate with a plurality of readers 230-1 located in AREA 1, controller S1C2 in the logical grouping of SITE 1 212-1 can support and communicate with a plurality of readers 230-1' located in AREA 1, controller S2C1 in the logical grouping of SITE 2 212-2 can support and communicate with a plurality of readers 230-2 located in AREA 2, controller S2C2 in the logical grouping of SITE 2 212-2 can support and communicate with a plurality of readers 230-2' located in AREA 2, controller S2C3 in the logical grouping of SITE 2 212-2 can support and communicate with a plurality of readers 230-3 located in AREA 3, controller S3C1 in the logical grouping of SITE 3 212-3 can support and communicate with a plurality of readers 230-4 located in AREA 4, controller S3C2 in the logical grouping of SITE 3 212-3 can support and communicate with a plurality of readers 230-4' located in AREA 4, and controller S4C1 in the logical grouping of SITE 4 212-4 can support and communicate with a plurality of readers 230-5 located in AREA 5.

FIG. 2 also illustrates the steps included in a method of downloading an APB status message in the system 200. For example, in Step 1, a valid card transaction can occur on an IN reader 230-1 located in AREA 1. The reader 230-1 can be supported by and communicate with controller S1C1, which can be in the logical grouping of SITE 1 212-1. The reader 230-1 can send a valid card transaction signal to controller S1C1, which can transmit a corresponding triggering signal to the host system 210. It is to be understood that a triggering signal as used herein can include a signal transmitted from an access controller to a host system responsive to a valid card transaction occurring at a card reader in communication with the access controller.

In Step 2, upon receipt of the triggering signal, the host system 210 can process the valid card transaction and identify the controllers to which a corresponding APB status update needs to be sent. Then, in Step 3, the host system 210 can transmit an APB status update message to some or all of the other controllers S1C2, S2C1, S2C2, S2C3, S3C1, S3C2, S4C1. In known systems and methods, which of the other controllers S1C2, S2C1, S2C2, S2C3, S3C1, S3C2, S4C1 receive the APB status update message depends on the type or form of APB feature (GLOBAL, SITE based, or AREA based) the controllers S1C1, S1C2, S2C1, S2C2, S2C3, S3C1, S3C2, S4C1 supported by the host system 210 support.

However, in the known systems of FIGS. 1 and 2, a single host system can only process homogeneous forms of an APB feature. That is, all access controllers that process a GLOBAL APB feature must be clustered together on a host system that only processes a GLOBAL APB feature. Similarly, all access controllers that process a SITE based APB feature must be clustered together on a host system that only processes a SITE based APB feature, and all access controllers that process an AREA based APB feature must be clustered together on a host system that only processes an AREA based APB feature.

Figure 3:
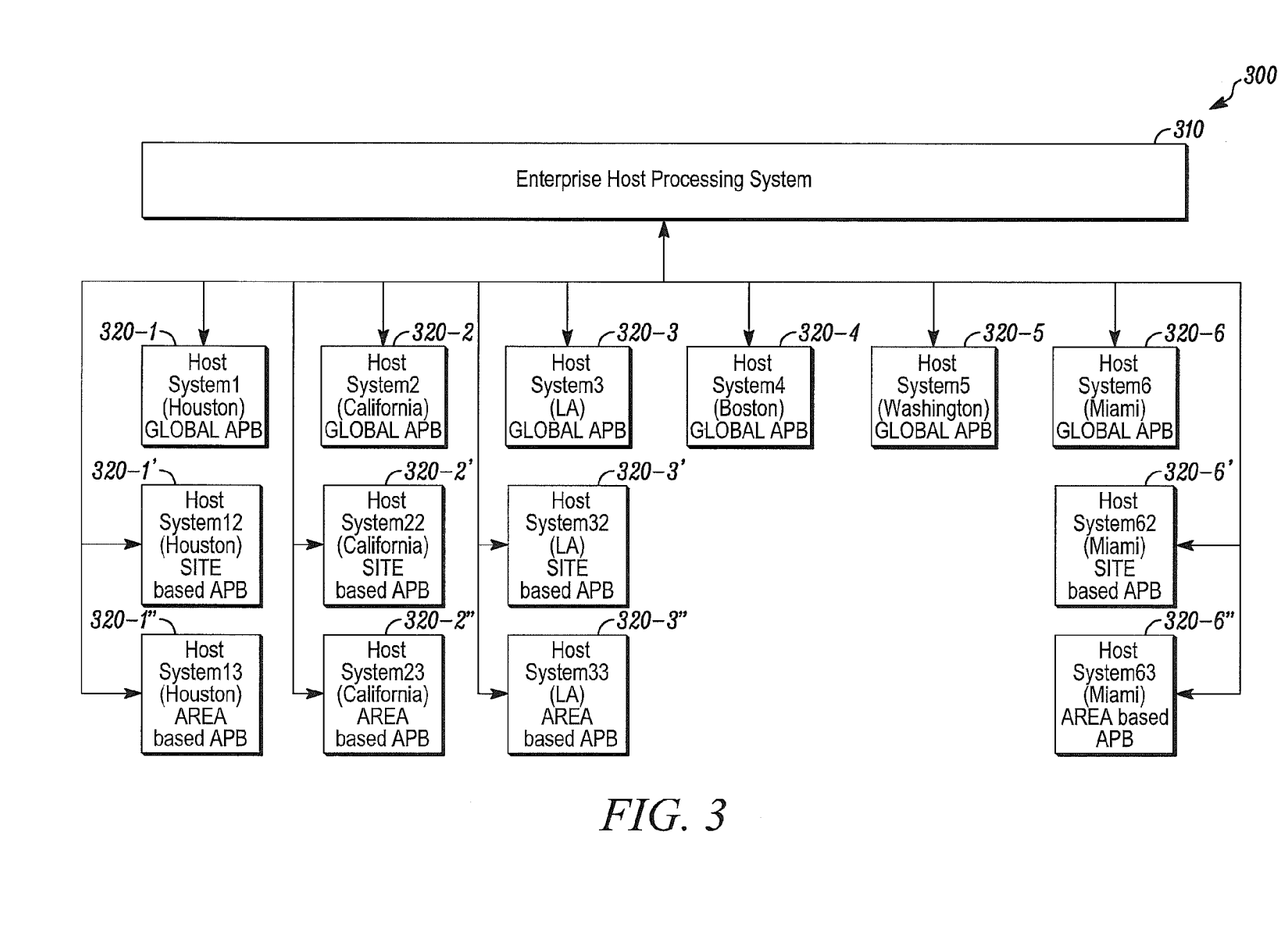
FIG. 3 is a block diagram of a known access control system.

As illustrated in FIGS. 1 and 2, an APB feature can operate in a facility that includes a plurality of card readers communicating with a plurality of different access controllers, each of which can participate in a respective APB feature. Accordingly, for each form of an APB feature, a separate host system will be needed. However, in a multi-region, interconnected system, a large number of host systems may be needed. For example, FIG. 3 is a block diagram of an exemplary known access control system 300 that includes an enterprise host system 310 supporting and communicating with a plurality of host systems 320 to support APB features in Houston, California, Los Angeles, Boston, Washington, and Miami. Indeed, each host system 320 can communicate with local access controllers.

As seen in FIG. 3, in Houston, the system 300 must include a first host system 320-1 that only processes a GLOBAL APB feature, a second host system 320-1' that only processes a SITE based APB feature, and a third host system 320-1" that only processes an AREA based APB feature. Similarly, in California, the system 300 must include a first host system 320-2 that only processes a GLOBAL APB feature, a second host system 320-2' that only processes a SITE based APB feature, and a third host system 320-2" that only processes an AREA based APB feature, and in Los Angeles, the system 300 must include a first host system 320-3 that only processes a GLOBAL APB feature, a second host system 320-3' that only processes a SITE based APB feature, and a third host system 320-3" that only processes an AREA based APB feature. In Boston, the system 300 includes a host system 320-4 that only processes a GLOBAL APB feature, and in Washington, the system 300 includes a host system 320-5 that only processes a GLOBAL APB feature. However, in Miami, the system 300 must also include a first host system 320-6 that only processes a GLOBAL APB feature, a second host system 320-6' that only processes a SITE based APB feature, and a third host system 320-6" that only processes an AREA based APB feature.

These types of known access control systems that include a large number of host systems can present several disadvantages to users. For example, such systems can be more expensive and require a higher investment in terms of hardware and software resources, including operating systems, licenses, and support for end users and customers. Such systems can also necessitate a large number of redundant and fail-over host systems in the event of a disaster. Furthermore, upgrading such systems can be a complex, time consuming, and cumbersome process that requires upgrading all host systems with the latest software updates and patches. Finally, such systems can require a large number of personnel for monitoring, IT support, badging, and configuration.

In view of the above, there is a continuing, ongoing need for improved systems and methods.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include a heterogeneous clustered anti-pass back (APB) host processing system and method. For example, in the system and method disclosed herein, heterogeneous forms of an APB feature can co-exist and can be processed by the same host system. That is, a single host system can process different forms of an APB feature.

In accordance with disclosed embodiments, a new AREA-specific APB type attribute can indicate a respective form of APB feature for access controllers referencing that AREA. For example, the AREA-specific APB type attribute can indicate whether access controllers referencing that AREA support and use APB features that are GLOBAL, SITE based, or AREA based. Accordingly, for every valid card transaction originating from an APB enabled access controller, the controller can transmit a corresponding triggering signal, and responsive thereto, a determination can be made as to what form of APB feature the access controller supports and uses based on the AREA referenced by the controller.

As explained above, it is to be understood that a triggering signal as used herein can include a signal transmitted from an access controller to a host system responsive to a valid card transaction occurring at a reader in communication with the access controller. It is to be further understood that a valid card transaction can include one that allows a user to gain access via a secured entryway by presenting a valid access card to a card reader.

Figure 4:
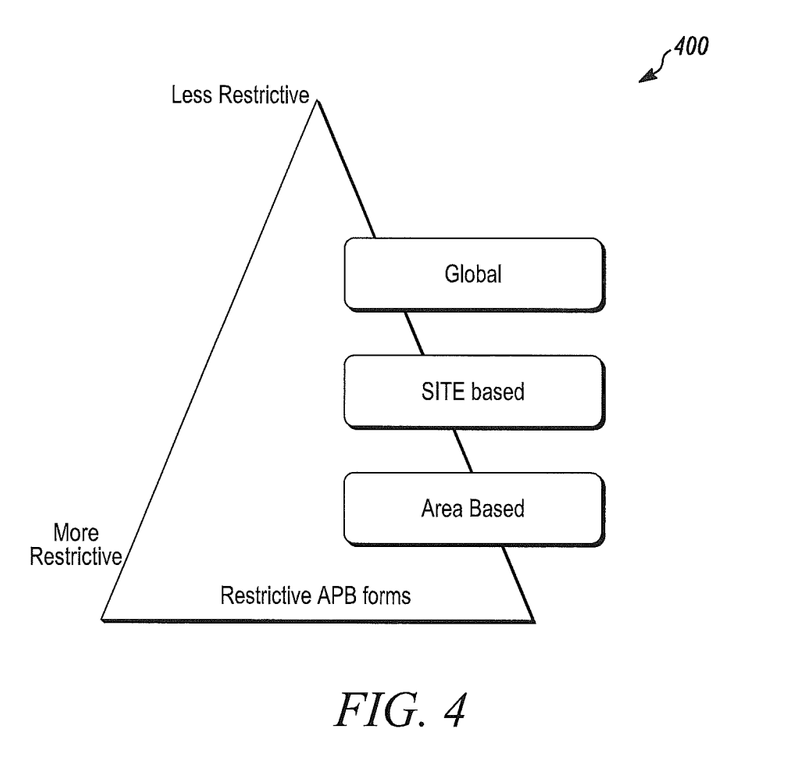
FIG. 4 is a graph illustrating the restrictiveness of forms of an APB feature.

In accordance with disclosed embodiments, when an access controller is located in, is associated with, or references one or more AREAs that support and use different forms of an APB feature, the least restrictive form of APB feature can be identified from the AREA-specific APB type attribute and applied for the controller. For example, restrictive levels can be defined in the following order: GLOBAL, SITE based, and AREA based. That is, as seen on the graph 400 in FIG. 4, GLOBAL is the least restrictive form of an APB feature, followed by SITE based, and then followed by AREA based. Accordingly, if an access controller references a first AREA that uses a SITE based APB feature and references a second AREA that uses a GLOBAL APB feature, then the controller can be designated as employing a GLOBAL APB feature because a GLOBAL APB feature is less restrictive. Similarly, if an access controller is references a first AREA that that uses an AREA based APB feature and references a second AREA that uses a SITE based APB feature, then the controller can be designated as employing a SITE based APB feature because a SITE based APB feature is less restrictive.

Figure 5:
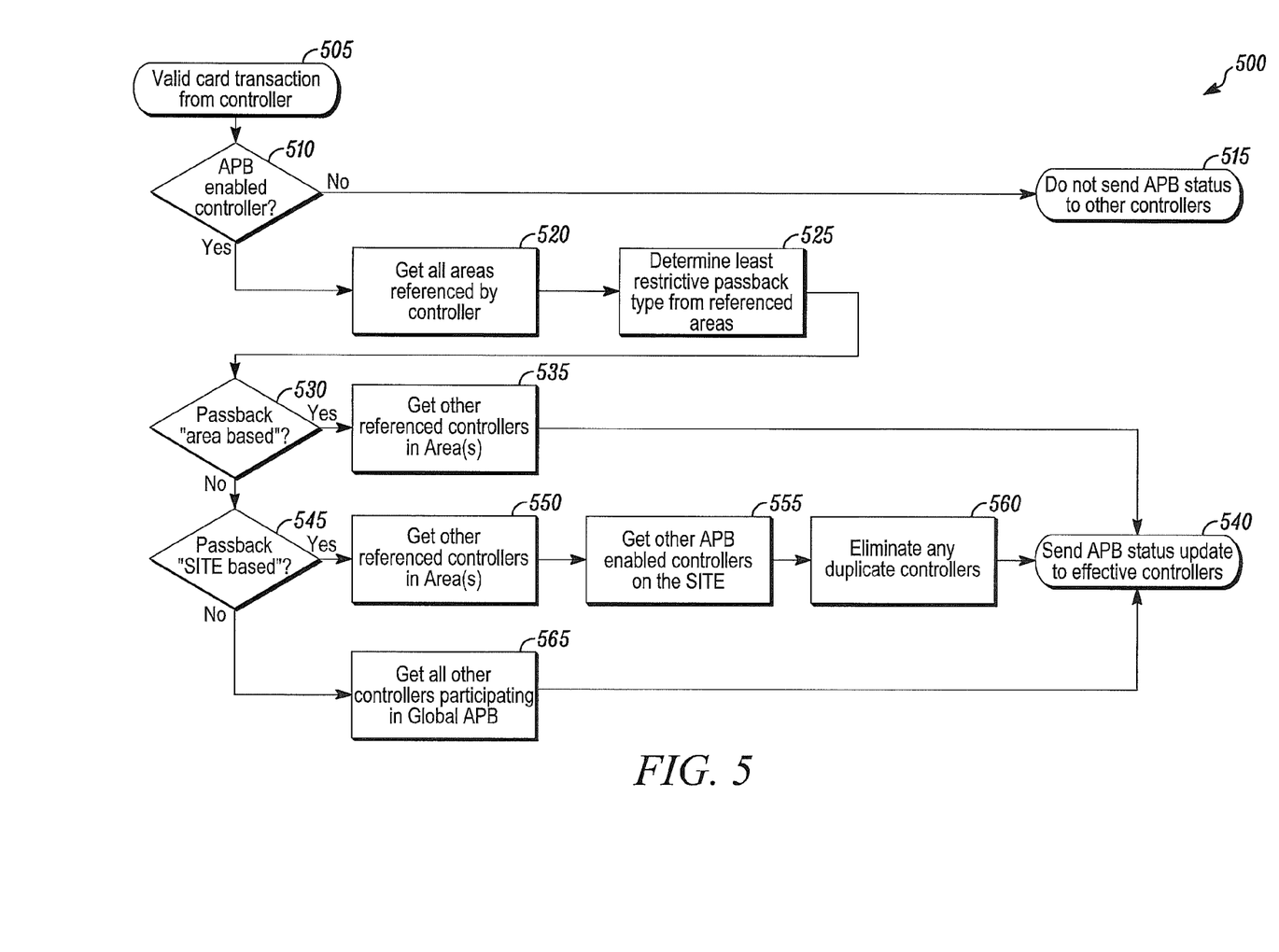
FIG. 5 is a flow diagram of an exemplary method in accordance with disclosed embodiments.

FIG. 5 is a flow diagram of an exemplary method 500 in accordance with disclosed embodiments. As seen in FIG. 5, the method 500 can include a host system receiving a triggering signal indicative of a valid card transaction from a first access controller as in 505. Then, the method 500 can include determining whether the first access controller is an APB enabled controller as in 510. If not, then the method 500 can refrain from sending APB status update messages to other controllers as in 515.

However, if the method 500 determines that the first access controller is an APB enabled controller as in 510, then the method 500 can identify all AREAs referenced by the first access controller as in 520 and determine the least restrictive type of APB feature from the referenced AREAs as in 525.

The method 500 can determine if the least restrictive type of APB feature is an AREA based APB feature as in 530. If yes, then the method 500 can identify other access controllers in referencing AREAs referenced by the first access controller as in 535 and transmit an APB status update message to those identified controllers as in 540.

However, if the method 500 determines that the least restrictive type of APB feature is not an AREA based APB feature as in 530, then the method 500 can determine whether the least restrictive type of APB feature is a SITE based APB feature as in 545. If yes, then the method 500 can identify other access controllers in referencing AREAs referenced by the first access controller as in 550, identify other APB enabled access controllers in the same SITE as the first access controller as in 555, eliminate any duplicate controllers identified in 550 and 555 as in 560, and transmit an APB status update message to the remaining identified controllers as in 540.

If the method 500 determines that the least restrictive type of APB feature is not a SITE based APB feature as in 545, then the method 500 can identify all other APB enabled access controllers participating in a GLOBAL APB feature as in 565 and transmit an APB status update message to those identified controllers as in 540.

In accordance with the above, the following equations are explanatory in determining the number of APB status update messages processed and generated by a host system in accordance with disclosed embodiments and transmitted by the host system to access controllers in accordance with disclosed embodiments. However, it is to be noted that the following assumptions and constraints apply to the equations: (1) user access cards have valid access on all APB enabled controllers, and (2) an APB enabled IN or OUT reader is not referenced in more than one AREA.

For access controllers designated as using a GLOBAL APB feature, Equation (1) applies:

$$\text{Number of APB status update messages generated per valid card transaction} = (\text{Number of APB access controllers communicating with the host system} - 1) \quad \text{Equation (1):}$$

For access controllers designated as using a SITE based APB feature, Equation (2) applies:

$$\text{Number of APB status update messages generated per valid card transaction} = (A+B-C-1), \quad \text{Equation (2):}$$

where
A=Total number of APB access controllers located in referenced AREAs,
B=Total number of APB access controllers in a respective SITE, and
C=Duplicate number of APB access controllers between A and B.

For example, if all access controllers in a respective SITE are included in all SITE specific AREAs, then Equation (3) applies:

$$\text{Number of APB status update messages generated per valid card transaction} = (B-1) \quad \text{Equation (3):}$$

For access controllers designated as using an AREA based APB feature, Equation (4) applies:

$$\text{Number of APB status update messages generated per valid card transaction} = (\text{Total number of APB access controllers located in referenced AREAs} - 1) \quad \text{Equation (4):}$$

In view of the above, Equation (5) applies for system and methods disclosed herein:

$$\text{Total number of APB status update messages generated in a heterogeneous host system} = [\text{Total number of valid card transactions occurring on readers on GLOBAL APB controllers}^*(\text{Total number of APB controllers}-1)] + \Sigma[\text{Total number of valid card transactions occurring on a reader on a controller in (SITE}(i)) \text{ using SITE based APB}^*(\text{Total number of corresponding unique APB enabled controllers in (SITE}(i)) \text{ and (reader referenced (AREA}(j))-1)] + \Sigma[\text{Total number of valid card transactions occurring on a reader on a controller using AREA based APB}^*(\text{Total number of APB enabled controllers in corresponding reader referenced (AREA }(k))-1)] \quad \text{Equation (5):}$$

Figure 6:
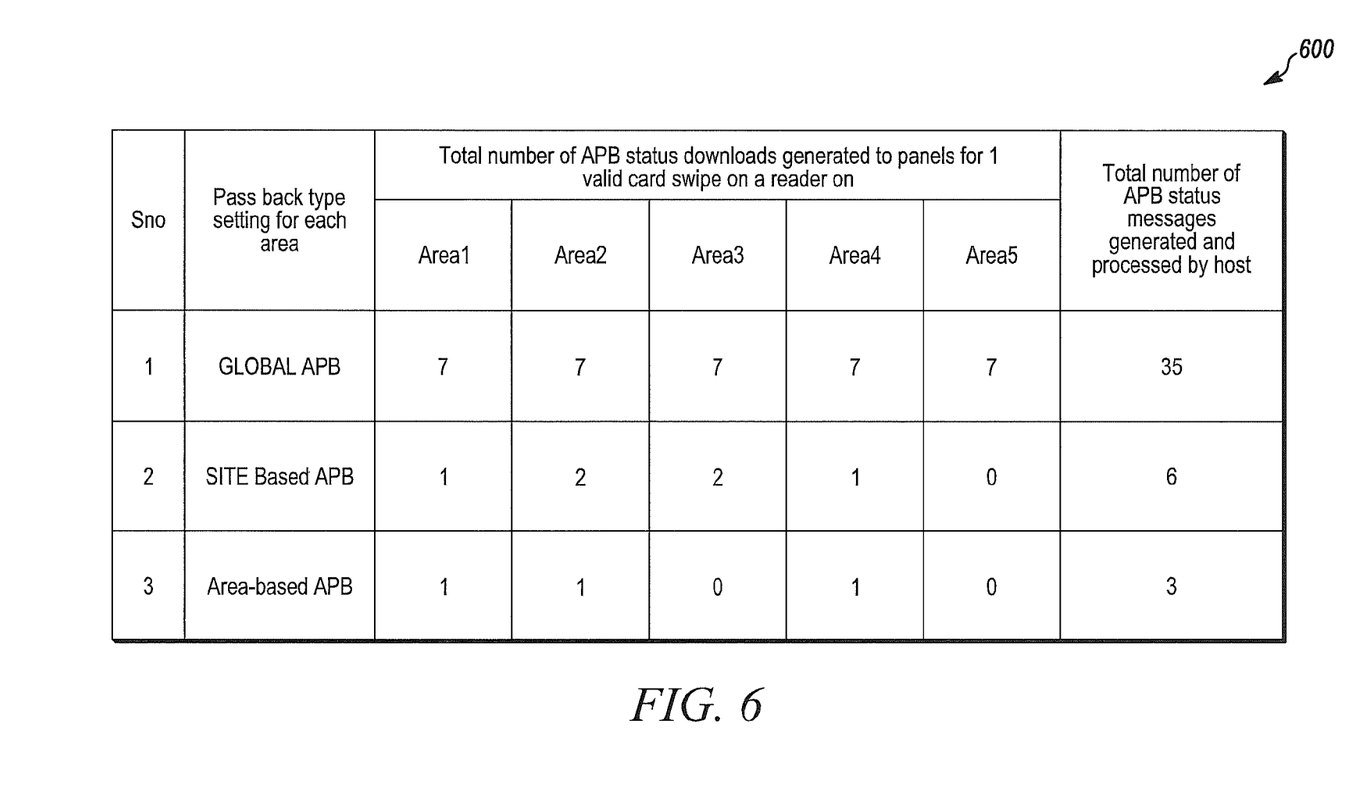
FIG. 6 is a chart of the total number of APB status update messages generated by an exemplary isolated APB host system.
Figure 7:
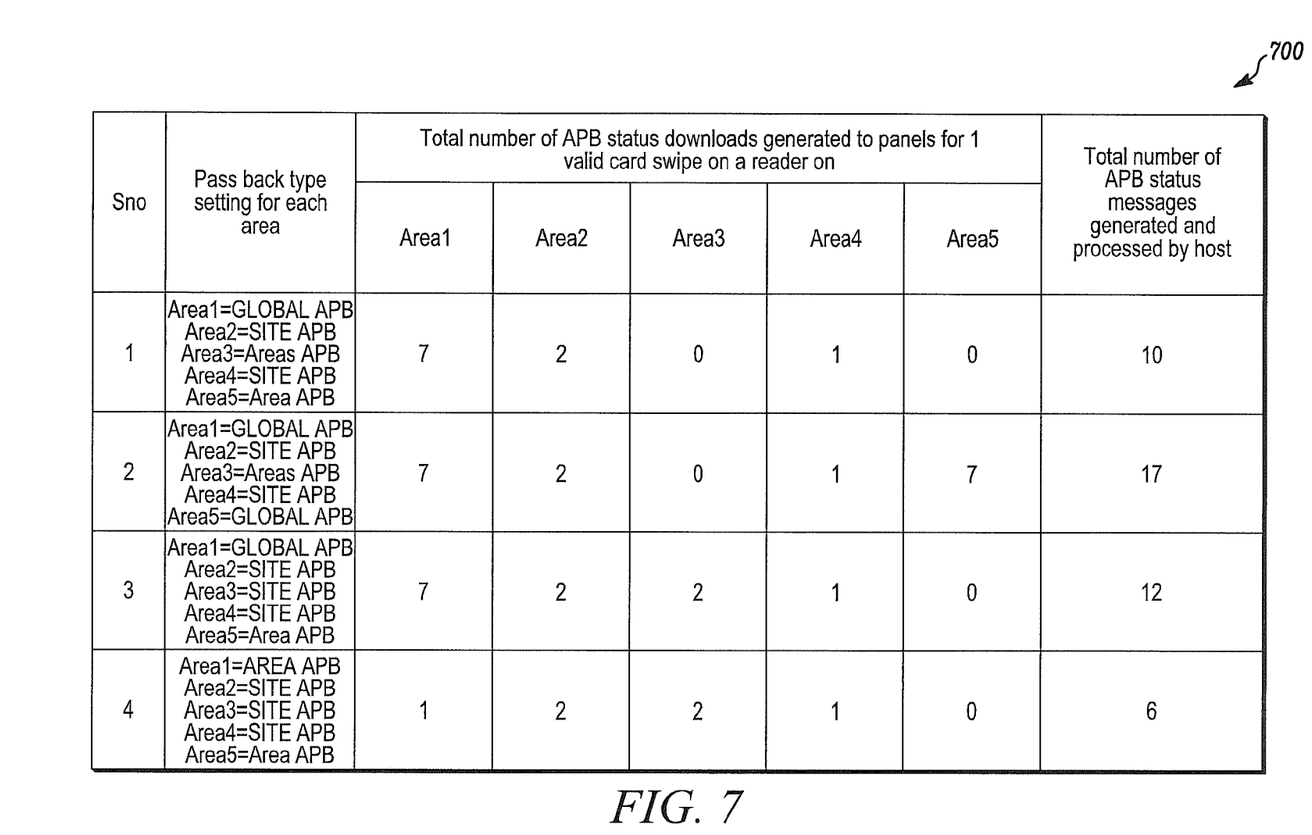
FIG. 7 is a chart of the total number of APB status update messages generated by an exemplary heterogeneous APB host system in accordance with disclosed embodiments.

FIG. 6 is a chart 600 of the total number of APB status update messages generated by an exemplary known APB host processing system that exclusively supports a GLOBAL APB feature, a SITE based APB feature, or an AREA based APB feature. However, FIG. 7 is a chart 700 of the total number of APB status update messages generated by an exemplary heterogeneous APB host processing system in accordance with disclosed embodiments. As seen, while the number of APB status update messages that are generated and downloaded in the exemplary heterogeneous APB host processing system is marginally increased as compared to an exclusive SITE or AREA based APB host processing system, the number of APB status messages that are generated and downloaded in the exemplary heterogeneous APB host processing system is greatly reduced as compared to an exclusively GLOBAL APB host processing system.

The systems and methods described above and herein can provide the benefit of eliminating the need for multiple host systems to process each form of APB feature. Indeed, typically host systems will have close proximity to the location of access controllers they support and will be on a local area network (LAN) in that geographical region. Accordingly, in a multi-region interconnected system, a single heterogeneous APB host processing system can replace multiple isolated APB host processing systems in a given region.

Figure 8:
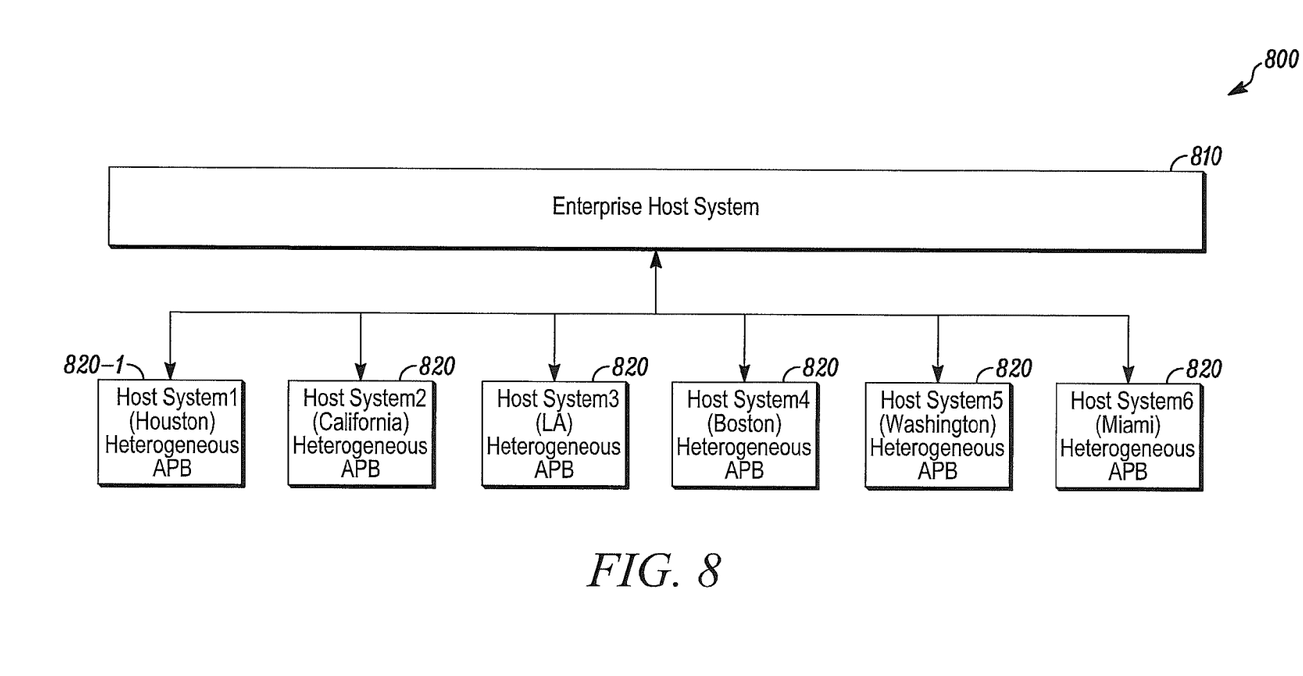
FIG. 8 is a block diagram of an exemplary access control system in accordance with disclosed embodiments.

In accordance with disclosed embodiments, FIG. 8 is a block diagram of an exemplary access control system 800 that includes that includes an enterprise host system 810 supporting and communicating with a plurality of heterogeneous host processing systems 820 in a plurality of different regions (Houston, California, Los Angeles, Boston, Washington, and Miami), where access controllers in each region communicate with and are supported by only a single heterogeneous host processing system 820. This is possible because each of the heterogeneous host processing systems 820 can process each of GLOBAL APB features, SITE based APB features, and AREA based APB features as described above and herein. Accordingly, as compared to the system 300 shown in FIG. 3, the system 800 shown in FIG. 8 can reduce the number of host systems employed.

It is to be understood that each heterogeneous host processing system 820 can include any computer or device that is capable of transmitting an APB status update message to an access controller. For example, when a valid card transaction occurs at a card reader in communication with a first access controller supported by and in communication with a first host processing system 820-1, the first access controller can transmit a corresponding triggering signal to the first host processing system 820-1. Responsive thereto, the first host processing system 820-1 can identify the least restrictive form of APB feature for AREAs in which the first access controller is referenced, can apply the identified least restrictive APB feature for the first access controller, and can transmit a corresponding APB status update message to the other host processing systems 820 and access controllers in the system 800 in accordance with the rules of the identified least restrictive APB feature.

Figure 9:
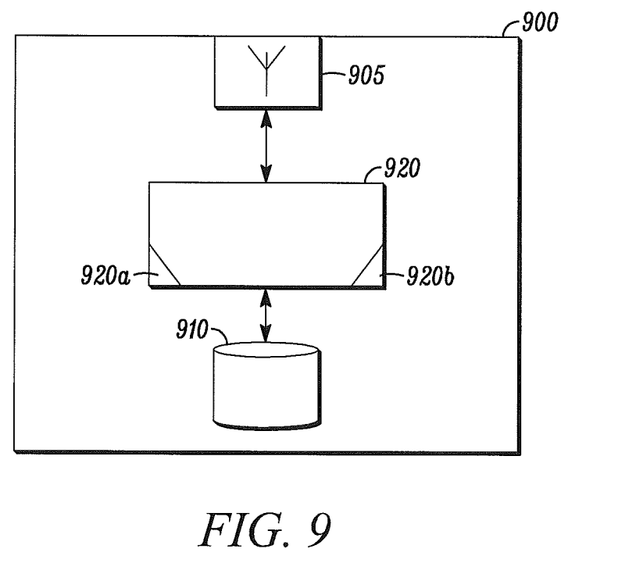
FIG. 9 is a block diagram of an exemplary heterogeneous host processing system in accordance with disclosed embodiments.

FIG. 9 is a block diagram of an exemplary heterogeneous host processing system 900 in accordance with disclosed embodiments. As seen, the system 900 can include a transceiver 905, a memory device 910, control circuitry 920, one or more programmable processors 920a, and executable control software 920b as would be understood by one of ordinary skill in the art. The executable control software 920b can be stored on a transitory or non-transitory computer readable medium, including, but not limited to local computer memory, RAM, optical storage media, magnetic storage media, and the like. In some embodiments, the control circuitry 920, the programmable processors 920a, and the executable control software 920b can execute and control some of the methods as described above and herein.

The memory device 910 can include a hard disk drive, RAM, or any other memory device as would be understood by one of ordinary skill in the art. Further, the memory device 910 can include a database that can identify each access controller supported by the host system 900, each AREA referenced by each of those supported access controllers, an AREA-specific APB type attribute for each AREA in an associated secured region, the form of APB feature the attribute uses, and the APB status for all APB access controllers supported by the host system 900. In some embodiments, the AREA-specific APB type attribute can be identified in the memory device 910 when configuring the secured region.

When a valid card transaction occurs, causing the heterogeneous host processing system 900 to receive a triggering signal from a first access controller, via the transceiver 905, the control circuitry 920, the programmable processors 920a, and the control software 920b can access the memory device 910 to update the database with APB status information in the triggering signal. The control circuitry 920, the programmable processors 920a, and the control software 920b can also access the memory device 910 to identify, from the database, all AREAs referenced by the first access controller and identify, from the database, the least restrictive form of APB feature of the identified AREAs. Additionally or alternatively, the control circuitry 920, the programmable processors 920a, and the control software 920b can identify all AREAs referenced by the first access controller or identify the least restrictive form of APB feature of the AREAs referenced by the first access controller from the triggering signal itself. Indeed, the heterogeneous host processing system 900 can combine APB type attributes for all of the AREAs in which the first access controller is referenced and choose the least restrictive APB type attribute for the controller.

The control circuitry 920, the programmable processors 920a, and the control software 920b can retrieve the APB status update from the database in the memory 910, can apply the identified least restrictive APB feature for the first access controller, and can transmit, via the transceiver 905, a corresponding APB status update message to other heterogeneous host processing systems and access controllers in accordance with the rules of the identified least restrictive APB feature. That is, based on the identified least restrictive APB type attribute for the first access controller, the heterogeneous host processing system 900 can generate and can transmit an appropriate APB status update message for the first access controller. For example, for a GLOBAL APB type attribute, the system 900 can transmit an APB status update message to all access controllers. For a SITE based APB type attribute, the system 900 can transmit an APB status update message to all unique access controllers in a respective SITE and located in referencing AREAs. For an AREA based APB type attribute, the system 900 can transmit an APB status update message to only access controllers located in referencing AREAs.

In accordance with the above, the following benefits can be achieved: improved scalability and throughput of the overall system, a reduced number of redundant or fail-over host systems needed for disaster recovery, competitive advantage, improved ROI for end users and customers, and lower network traffic. For example, an optimal use of existing hardware, software, and personnel to maintain, monitor, and upgrade a reduced number of host systems can be achieved, and because there is less inter-host network traffic, network bandwidth can be improved, especially if host systems are on a wide area network (WAN).

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
   a plurality of hardware access controllers; and
   a hardware heterogeneous host system supporting each of the plurality of hardware access controllers regardless of a respective type of anti-pass back feature associated with each of the plurality of hardware access controllers,
   wherein first access controllers in the plurality of hardware access controllers that reference a first area in a secured region have a first type of the anti-pass back feature,
   wherein second access controllers in the plurality of hardware access controllers that reference a second area in the secured region have a second type of the anti-pass back feature,
   wherein a third access controller in the plurality of hardware access controllers references both the first area and the second area, and
   wherein the hardware heterogeneous host system identifies the third access controller as having the first type of the anti-pass back feature when the first type of the anti-pass back feature is less restrictive than the second type of the anti-pass back feature and as having the second type of the anti-pass back feature when the second type of the anti-pass back feature is less restrictive than the first type of the anti-pass back feature.

2. The system of claim 1 wherein the first type of the anti-pass back feature is one of GLOBAL, SITE based, and AREA based.

3. The system of claim 2 wherein a GLOBAL type of the anti-pass back feature is less restrictive than a SITE based type of the anti-pass back feature, and wherein a SITE based type of the anti-pass back feature is less restrictive than an AREA based type of the anti-pass back feature.

4. A method comprising:
   a heterogeneous host system receiving a triggering signal from a first access controller in a plurality of access controllers irrespective of a respective type of anti-pass back feature associated with the first access controller;
   the heterogeneous host system identifying all areas referenced by the first access controller;
   the heterogeneous host system identifying the respective type of the anti-pass back feature associated with each of the areas referenced by the first access controller;
   the heterogeneous host system identifying a least restrictive type of the respective type of the anti-pass back feature associated with each of the areas referenced by the first access controller; and
   the heterogeneous host system transmitting an anti-pass back status update message to each of the plurality of access controllers in accordance with rules of the least restrictive type of the respective type of the anti-pass back feature associated with each of the areas referenced by the first access controller.

5. The method of claim 4 wherein the heterogeneous host system identifying the areas referenced by the first access controller and the heterogeneous host system identifying the respective type of the anti-pass back feature associated with each of the areas referenced by the first access controller includes the heterogeneous host system identifying the areas referenced by the first access controller and identifying the respective type of the anti-pass back feature associated with each of the areas referenced by the first access controller in a memory device of the heterogeneous host system.

6. The method of claim 4 wherein the heterogeneous host system identifying the areas referenced by the first access controller and the heterogeneous host system identifying the respective type of the anti-pass back feature associated with each of the areas referenced by the first access controller includes the heterogeneous host system identifying the areas referenced by the first access controller and identifying the respective type of the anti-pass back feature associated with each of the areas referenced by the first access controller from content of the triggering signal.

7. The method of claim 4 wherein the heterogeneous host system identifying the least restrictive type of the respective type of the anti-pass back feature associated with each of the areas referenced by the first access controller includes identifying a GLOBAL type of the anti-pass back feature when the GLOBAL type of the anti-pass back feature is associated with any of the areas referenced by the first access controller.

8. The method of claim 4 wherein the heterogeneous host system identifying the least restrictive type of the respective type of the anti-pass back feature associated with each of the areas referenced by the first access controller includes identifying a SITE based type of the anti-pass back feature when the SITE based type of the anti-pass back feature is associated with any of the areas referenced by the first access controller but a GLOBAL type of the anti-pass back feature is not associated with any of the areas referenced by the first access controller.

9. The method of claim 4 wherein the heterogeneous host system identifying the least restrictive type of the respective type of the anti-pass back feature associated with each of the areas referenced by the first access controller includes identifying an AREA based type of the anti-pass back feature when the AREA based type of the anti-pass back feature is associated with any of the areas referenced by the first access controller but neither a GLOBAL type of the anti-pass back feature nor a SITE based type of the anti-pass back feature is associated with any of the areas referenced by the first access controller.

10. The method of claim 4 further comprising the heterogeneous host system transmitting the anti-pass back status update message to all of the plurality of access controllers when the identified least restrictive type of the respective type of the anti-pass back feature associated with each of the areas referenced by the first access controller includes a GLOBAL type of the anti-pass back feature.

11. The method of claim 4 further comprising the heterogeneous host system transmitting the anti-pass back status update message to all unique ones of the plurality of access controllers that are in a site of the first access controller and located in the areas referenced by the first access controller when the least restrictive type of the respective type of the anti-pass back feature associated with each of the areas referenced by the first access controller includes a SITE based type of the anti-pass back feature.

12. The method of claim 4 further comprising the heterogeneous host system transmitting the anti-pass back status update message to all of the plurality of access controllers that are located in the areas referenced by the first access controller when the least restrictive type of the respective type of the anti-pass back feature associated with each of the areas referenced by the first access controller includes an AREA based type of the anti-pass back feature.

13. A system comprising:
a transceiver;
a programmable processor; and
executable control software stored on a non-transitory computer readable medium,
wherein the transceiver receives a triggering signal from a first access controller in a plurality of access controllers irrespective of a respective type of anti-pass back feature associated with the first access controller,
wherein the programmable processor and the executable control software identify all areas referenced by the first access controller,
wherein the programmable processor and the executable control software identify the respective type of the anti-pass back feature associated with each of the areas referenced by the first access controller,
wherein the programmable processor and the executable control software identify a least restrictive type of the respective type of the anti-pass back feature associated with each of the areas referenced by the first access controller, and
wherein the transceiver transmits an anti-pass back status update message to each of the plurality of access controllers in accordance with rules of the least restrictive type of the respective type of the anti-pass back feature associated with each of the areas referenced by the first access controller.

14. The system of claim 13 wherein the programmable processor and the executable control software identify the areas referenced by the first access controller and identify the respective type of the anti-pass back feature associated with each of the areas referenced by the first access controller via content in the triggering signal.

15. The system of claim 13 further comprising:
a memory device,
wherein the programmable processor and the executable control software identify the areas referenced by the first access controller and identify the respective type of the anti-pass back feature associated with each of the areas referenced by the first access controller from a database in the memory device.

16. The system of claim 13 wherein the programmable processor and the executable control software identify the least restrictive type of the respective type of the anti-pass back feature associated with each of the areas referenced by the first access controller as a GLOBAL type of the anti-pass back feature when the GLOBAL type of the anti-pass back feature is associated with any of the areas referenced by the first access controller, wherein the programmable processor and the executable control software identify the least restrictive type of the respective type of the anti-pass back feature associated with each of the areas referenced by the first access controller as a SITE based type of the anti-pass back feature when the SITE based type of the anti-pass back feature is associated with any of the areas referenced by the first access controller but the GLOBAL type of the anti-pass back feature is not associated with any of the areas referenced by the first access controller, and wherein the programmable processor and the executable control software identify the least restrictive type of the respective type of the anti-pass back feature associated with each of the areas referenced by the first access controller as an AREA based type of the anti-pass back feature when the AREA based type of the anti-pass back feature is associated with any of the areas referenced by the first access controller but neither the GLOBAL type of the anti-pass back feature nor the SITE based type of the anti-pass back feature is associated with any of the areas referenced by the first access controller.

17. The system of claim 13 wherein the transceiver transmits the anti-pass back status update message to all of the plurality of access controllers when the least restrictive type of the respective type of the anti-pass back feature associated with each of the areas referenced by the first access controller includes a GLOBAL type of the anti-pass back feature, wherein the transceiver transmits the anti-pass back status update message to all unique ones of the plurality of access controllers that are in a site of the first access controller and located in the areas referenced by the first access controller when the least restrictive type of the respective type of the anti-pass back feature associated with each of the areas referenced by the first access controller includes a SITE based type of the anti-pass back feature, and wherein the transceiver transmits the anti-pass back status update message to all of the plurality of access controllers that are located in the areas referenced by the first access controller when the least restrictive type of the respective type of the anti-pass back feature associated with each of the areas referenced by the first access controller includes an AREA based type of the anti-pass back feature.

* * * * *